United States Patent [19]
Gupta et al.

[11] Patent Number: 4,937,319
[45] Date of Patent: Jun. 26, 1990

[54] PROCESS FOR PRODUCING AROMATIC POLYESTERS

[75] Inventors: Balaram Gupta; John R. Costanza, both of North Plainfield, N.J.

[73] Assignee: Hoechst Celanese Corp., Somerville, N.J.

[21] Appl. No.: 370,929

[22] Filed: Jun. 23, 1989

[51] Int. Cl.$^5$ .............................................. C08G 63/18
[52] U.S. Cl. .................................... 528/180; 528/176; 528/271
[58] Field of Search ................................. 528/176, 180

[56] References Cited

U.S. PATENT DOCUMENTS 4,281,099  7/1981  Maresca ............................... 528/176
4,296,232  10/1981  Maresca et al. ..................... 528/179
4,414,381  11/1983  Griffen et al. ....................... 528/271
4,680,372  7/1987  Rosenfield ........................... 528/179

FOREIGN PATENT DOCUMENTS 549667  10/1956  Belgium .

*Primary Examiner*—Harold D. Anderson
*Assistant Examiner*—T. Mosley
*Attorney, Agent, or Firm*—Marvin Turken

[57] ABSTRACT

A process is described for producing shapable aromatic polyesters derived from bisphenol A and a dicarboxylic acid comprising isophthalic acid, terephthalic acid, or a mixture of the two, comprising forming a mixed anhydride of said dicarboxylic acid and acetic acid, and subsequently reacting said mixed anhydride with bisphenol A while drawing off acetic acid by-product to obtain said aromatic polyester.

15 Claims, No Drawings

PROCESS FOR PRODUCING AROMATIC POLYESTERS

BACKGROUND OF THE INVENTION

1. Field of the Invention

This invention relates to a novel process for the production of aromatic polyesters utilizing mixed anhydrides as intermediates.

2. Description of Related Art

The following information is disclosed in accordance with the terms of 37 CFR 1.56, 1.97 and 1.98.

U.S. Pat. No. 4,680,372 issued July 14, 1987 to Rosenfeld discloses the production of aromatic polyesters of a bisphenol, e.g. bisphenol A, and an aromatic dicarboxylic acid, e.g., terephthalic and/or isophthalic acid, by melt polymerizing the bisphenol and the acid or a diester thereof in the presence of phenyl benzoate.

U.S. Pat. No. 4,296,232 issued Oct. 20, 1981 to Maresca et al. discloses the preparation of polyarylates, i.e., aromatic polyesters, by reacting a diester of a dihydric phenol, e.g., bisphenol A, with an aromatic dicarboxylic acid, e.g., a mixture of terephthalic and isophthalic acids, in the presence of a diphenyl ether compound and a magnesium catalyst.

U.S. Pat. No. 4,281,099 issued July 28, 1981 to Maresca, discloses a process similar to that of U.S. Pat. No. 4,296,232 described previously except that a stabilizing amount of an aromatic phenol, e.g., p-phenylphenol, is added to the polyarylate to eliminate residual anhydride linkages.

Belgian Patent No. 549,667, published Nov. 16, 1956, C.A. 52:5033g (1958) discloses a process for the preparation of polyethylene terephthalate (PET) comprising the steps of forming a mixed anhydride of terephthalic and acetic acids, heating the latter mixed anhydride as a solution in 1-methylnaphthalene to distill off acetic acid and acetic anhydride and obtain a polymeric mixed anhydride containing 96% of terephthalic moieties, and reacting the latter polymeric anhydride with ethylene glycol in the presence of antimony trioxide to obtain PET.

SUMMARY OF THE INVENTION

In accordance with this invention, an aromatic polyester or polyarylate capable of being formed into shaped articles and derived from bisphenol A, i.e., 2,2-bis (4'-hydroxyphenyl) propane, and an aromatic dicarboxylic acid comprising isophthalic and/or terephthalic acid, is prepared by a process comprising the steps of initially forming a mixed anhydride of the dicarboxylic acid and acetic acid, and subsequently reacting the mixed anhydride with bisphenol A with the liberation of acetic acid to obtain the aromatic polyester.

The inventive process may be carried out at a relatively low temperature resulting in less sublimation of dicarboxylic acid from the reaction zone (which must then be recovered), and the formation of a polymer having better processability, when compared with a process which does not include the initial formation of the mixed anhydride.

DESCRIPTION OF PREFERRED EMBODIMENTS

The aromatic dicarboxylic acid utilized in the process of this invention may be composed solely of isophthalic or terephthalic acid. Preferably, however, such acid consists of a mixture of the two acids wherein the weight ratio of isophthalic to terephthalic acid may be, for example, from about 9:1 to 1:9, more preferably about 4:1 to 1:4, and most preferably about 3:1.

The formation of the mixed anhydride in the initial step of the process of this invention is preferably accomplished by reacting the dicarboxylic acid with acetic anhydride. In most cases the amount of acetic anhydride will be sufficient to react with substantially all the carboxyl groups of the dicarboxylic acid to form anhydride linkages with the liberation of acetic acid. Moreover, the reaction is carried out under such conditions that the carboxyl groups of the dicarboxylic acid do not tend to react with each other to form anhydride linkages. Thus, a slight excess of acetic anhydride, e.g., up to about 5 mol % of the amount which is stoichiometrically equivalent to the carboxyl groups of the dicarboxylic acid may be reacted with the acid, e.g., by refluxing these reactants at a temperature for example, of about 145° to 160° C. for a period of about 45 to 90 min. While an amount of acetic anhydride substantially different from that equivalent to the carboxyl groups of the dicarboxylic acid may be utilized, there does not appear to be any advantage in doing so.

After the formation of the mixed anhydride of the dicarboxylic acid and acetic acid in the initial step of the inventive process, it is reacted with bisphenol A in an amount stoichiometrically equivalent to the dicarboxyl acid in the presence of a polymerization catalyst to obtain the aromatic polyester. The polymerization reaction may be carried out for example, at a temperature of about 280° to 330° C. for a period of about 60 to 260 min. In general, the polymerization is initiated at a lower temperature at close to atmospheric pressure, and the temperature is raised in stages while reducing the pressure by evacuation to remove acetic acid by-product until a fairly high vacuum is reached and a polymeric product having the desired properties, e.g., of inherent viscosity, is obtained.

The second or polymerization step of the process is carried out in the presence of an acidic, neutral or basic esterification catalyst, such classifications being based on the reaction of a conventional acid-base indicator and the catalyst when the latter is dissolved in a polar ionizing solvent such as water.

More preferably, a basic catalyst is employed. Prior to its introduction into the reaction mass, the preferred basic catalyst is preferably converted to liquid form, e.g. by melting or by dissolution in a liquid or normally solid, low melting solvent.

Suitable basic catalysts include the alkali metals, such as lithium, sodium, potassium, rubidium, and cesium, in elemental (metallic) form or as compounds such as hydroxides, hydrides, borohydrides, basic salts such as carbonates, phenates, bisphenates, (i.e. salts of a phenol or bisphenol), and carboxylates such as acetate or benzoate, and oxides of the foregoing alkali metals. Group II and III elements can also be used in place of the alkali metals of the foregoing classes of compounds such as metals and compounds of calcium, magnesium and aluminum. Other bases include trialkyl or triaryl tin hydroxides, acetates, phenates, and the like.

Suitable acid catalysts include transition metal salts of strong inorganic acids, while suitable neutral catalysts include transition metal salts of aliphatic carboxylic acids, e.g., acetic acid. The preferred transition metals making up the foregoing catalysts are Group VII and VIII metals, e.g. cobalt.

Examples of specific catalysts are lithium, sodium, potassium, rubidium, and cesium metals, potassium or rubidium carbonate, lithium hydroxide, potassium hydroxide, lithium hydride, sodium borohydride, potassium borohydride, lithium acetate, potassium acetate, calcium acetate, magnesium acetate, cobalt acetate, aluminum triisopropoxide and triphenyl tin hydroxide. Combinations of the foregoing catalysts may be used. The catalyst may be present in a catalytically effective amount in the range, for example, of about 0.005 to 2%, preferably about 0.01 to 1% by weight, based on the combined weight of bisphenol A and dicarboxylic acid reactants.

If desired, a solvent may be used in both steps of the process, or only the second step. The solvent may be, for example, a non-polar hydrocarbon or chlorinated hydrocarbon, e.g. a polyaromatic hydrocarbon and/or ether such as Dowtherm A (a eutectic mixture of diphenyl and diphenyl ether) or 1,1-di(orthoxylyl)ethane known as DXE, or chlorinated polyaromatic hydrocarbons and/or ethers such as Therminol 66 or Therminol 77 and the like.

The process of this invention can be used to produce aromatic polyesters of superior processability having an inherent viscosity of about 0.1 to 0.7 dl/g, preferably about 0.3 to 0.6 dl/g., measured in tetracholorethane at 30° C. These polymers can generally be formed into shaped articles such as fibers, films and molded articles.

The following examples further illustrate the invention.

EXAMPLE 1

In a 2 liter glass reactor immersed in a sand bath and equipped with a nitrogen inlet, thermocouple, vigreux column attached to reflux condenser, and C shaped glass mechanical stirrer were placed (a) 253.65 grams (1.528 moles) of isophthalic acid, and (b) 84.33 grams (0.508 moles) of terephthalic acid under a constant purge of nitrogen (30-40 cc/min). The reactor was evacuated to approximately 1 to 2 mbar followed by breaking the vacuum with nitrogen. The vacuum-nitrogen purging process was repeated twice and 439 grams (4.304 moles, 2.5 mol % excess of 98.5 mol % purity) of acetic anhydride and 430 grams of Dowtherm A were introduced into the reactor through an addition funnel. The reactor was then heated in stages as using the MicRIcon controller as follows.

| Segment | 1 | 2 | 3 | 4 | 5 | 6 | 7 | 8 | 9 | 10 | 11 |
|---|---|---|---|---|---|---|---|---|---|---|---|
| Temp. (C.) | 25 | 25-150 | 150 | 150-140 | 140-240 | 240-260 | 260-290 | 290 | 290 | 10 | 10 |
| Time (mins) | 1 | 60 | 60 | 10 | 60 | 20 | 60 | 60 | 60 | 30 | 1 |

The reactants were allowed to reflux until the end of segment 3, during which time the dicarboxylic acids partially dissolved to form mixed anhydrides of phthalic and acetic acids. At the beginning of segment 4, the refluxing was stopped by reducing the temperature. At this time, 465.12 grams (2.04 moles) of bisphenol A, 1.6 ml of lithium hydroxide solution (obtained by dissolving 1.78 grams of anhydrous lithium hydroxide in 50 ml glacial acetic acid), and 1.6 ml of cobalt acetate solution (obtained by dissolving 1.55 grams of anhydrous cobalt acetate in 50 ml glacial acetic acid) were introduced into the reactor through an addition funnel. Any solids adhering to the funnel were washed off into the reactor by using small amounts of Dowtherm A (10-20 ml). The reflux condenser was then tilted horizontally for a distillation set-up and a receiver was attached at its end. The heating was resumed and the acetic acid began distilling off when the reactor was at 150° C. When the reactor temperature reached 260° C. in segment 6 of the MicRicon controller, the nitrogen purge was turned off and the reactor was evacuated in stages to about 2 mbar in about 1 hour, making sure no bumping occurred. The torque on the stirrer started to rise and the reaction was terminated when an increase in torque of 54 mvolts from the initial value was attained. The reactor was cooled and broken to obtain a clear colorless glassy polymer. The polymer was then cut and ground into powder, yield 662.8 grams (93%), and small amounts of sublimed solids were collected in the vigreux column (1.9 g) and distilling trap (5.6 g).

The polymer had an inherent viscosity (I.V.) of 0.34 dl/g when measured in tetrachloroethane (0.5% w/v) at 30° C., and 0.33 dl/g as measured by melt flow index. The glass transition temperature ($T_g$) was found to be 171° C. as determined by differential scanning calorimetry (DSC; 20° C./min heating rate), and exhibited no melting endotherm. The melt viscosity of the polymer at 330° C. and at shear rates of 100 and 1000 sec$^{-1}$ was determined to be 1984 and 1149 poise respectively. The hunter color results measured on a compression molded disc were as follows: YI 8.02, b 4.81, a −1.98, and L 92.25.

The polymer was injection molded into test bars for tensile (ASTM D638), flex (ASTM D790), notched IZOD (ASTM D256), and heat-deflection temperature (ASTM D648) testing. The test specimens were injection molded at a barrel temperature of 315° C. and a mold temperature of 100° C. The results of the testing according to ASTM procedures were as follows: tensile strength 2.4 kpsi, tensile elongation 0.7%, tensile modulus 0.4 mpsi; flex strength 6.8 kpsi; flex modulus 0.4 mpsi; notched IZOD impact strength 0.6 ft-lb/in; and heat deflection temperature (@264 psi) 138° C.

COMPARATIVE EXAMPLE A

Example 1 was repeated except that the bisphenol A and the catalyst solutions were added to the reactor at the beginning instead of with delayed addition and the heating stages were modified as follows:

| Segment | 1 | 2 | 3 | 4 | 5 | 6 | 7 | 8 | 9 | 10 |
|---|---|---|---|---|---|---|---|---|---|---|
| Temp. (C.) | 25 | 25-150 | 150 | 150-240 | 240-260 | 260-290 | 290 | 290 | 10 | 10 |
| Time (mins) | 1 | 60 | 60 | 60 | 20 | 60 | 60 | 60 | 30 | 1 |

The reactor was also set up for distillation at the beginning instead of the reflux set-up as in Example 1. The acetic acid began distilling off when the reactor was at 150° C. as in Example 1, but the rate of distillation of the liquids was much slower indicating that the rate of esterification was slower than in Example 1 (255 ml distilled at 260° C. vs. 305 ml in Example 1). When the reactor temperature reached 260° C. in segment 5 of the MicRicon controller, the nitrogen purge was turned off and the reactor was evacuated in stages to about 2 mbar in about 1 hour, making sure no bumping occurred. The torque on the stirrer started to rise and the reaction was terminated when an increase in torque of 54 mvolts from the initial value was attained. The reactor was cooled and broken to obtain a clear colorless glassy polymer. The polymer was then cut and ground into powder; yield 635.7 grams (89%), and considerable amounts of sublimed solids were collected in the vigreux column (2.1 g) and distilling trap (18.7 g).

The polymer had an inherent viscosity (I.V.) of 0.34 dl/g when measured in tetrachloroethane (0.5% w/v) at 30° C., and 0.29 dl/g as measured by melt flow index. The glass transition temperature ($T_g$) was found to be 170° C. as determined by differential scanning calorimetry (DSC; 20° C./min heating rate), and exhibited no melting endotherm. The melt viscosity of the polymer at 330° C. was considerably lower than the polymer obtained as in Example 1 and at shear rates of 100 and 1000 $sec^{-1}$ was determined to be 796 and 867 poise respectively. The hunter color results measured on a compression molded disc were as follows: YI 4.73, b 2.69, a $-0.91$, and L 93.71.

The polymer could not be injection molded into test bars for determining the mechanical properties as in Example 1. This clearly demonstrates that the delayed addition of bisphenol A to preformed mixed anhydrides of the dicarboxylic and acetic acids improves the processing properties of the resulting polyarylate and substantially retains all the other desirable properties.

EXAMPLE 2

This example illustrates the process of the invention carried out in the absence of any solvent.

The apparatus of Example 1 was employed with the following amounts of reactants: isophthalic acid 63.48 grams (0.382 moles), terephthalic acid 21.58 grams (0.127 moles), acetic anhydride 109.8 grams (1.076 moles). After refluxing the acids for one hour at 160° C. under argon atmosphere, the flask was cooled and 116.28 grams (0.51 moles) of bisphenol A, 0.4 ml of lithium acetate solution (3.1 g in 100 ml acetic acid), and 0.4 ml cobalt acetate solution (3.56 g in 100 ml acetic acid) were added to the contents of the flask. Heating was resumed, vacuum was applied when the flask reached 260° C., and the reaction was terminated when an increase in torque at 44 mvolts from the initial value was attained. The yield of polymer was 164.4 grams (90%).

The polymer had an inherent viscosity (I.V.) of 0.3 dl/g when measured in tetrachloroethane (0.5% w/v) at 30° C. The glass transition temperature ($T_g$) was found to be 169° C. as determined by differential scanning calorimetry (DSC; 20° C./min heating rate), and exhibited no melting endotherm.

EXAMPLE 3

This example illustrates the use of potassium acetate as a catalyst during the second (polyesterification) step.

The apparatus of Example 1 was employed with the following amounts of materials—first step: 14.94 grams (90 mmole) of isophthalic acid, 4.98 grams (30 mmole) of terephthalic acid, and 600 ml of acetic anhydride; second step: 27.64 grams of bisphenol A (121.2 mmole) and 0.004 grams of potassium acetate (80 ppm). During the first step, reflux was continued until all the diacids dissolved in acetic anhydride, indicating the complete formation of the mixed anhydrides. The excess acetic anhydride was distilled off at this point under reduced pressure while maintaining the temperature of the flask at or below 60° C. Bisphenol A and potassium acetate were then added to the syrupy mass and further polymerization was continued by heating the flask in stages as described before until it reached 250° C. at which time vacuum was applied and the temperature was again gradually increased to 295° C. The reaction was terminated at this temperature without allowing torque on the stirrer to rise. The inherent viscosity of the polymer was determined to be 0.14 dl/g in tetrachloroethane (0.5% w/v). The glass transition temperature ($T_g$) was found to be 128° C. as determined by DSC.

We claim:

1. A process for producing shapable aromatic polyesters derived from bisphenol A and a dicarboxylic acid comprising isophthalic acid, terephthalic acid, or a mixture of the two, comprising forming a mixed anhydride of said dicarboxylic acid with acetic acid, and subsequently reacting said mixed anhydride with bisphenol A while drawing off acetic acid by-product to obtain said aromatic polyester.

2. The process of claim 1 wherein said mixed anhydride is prepared by reacting said dicarboxylic acid with acetic anhydride.

3. The process of claim 2 wherein said dicarboxylic acid consists of a mixture of isophthalic and terephthalic acids.

4. The process of claim 3 wherein the weight ratio of isophthalic acid to terephthalic acid in said mixture is about 4:1 to 1:4.

5. The process of claim 4 wherein said weight ratio is about 3:1.

6. The process of claim 1 wherein said reaction of mixed anhydrides and bisphenol A is carried out in the presence of an esterification catalyst.

7. The process of claim 6 wherein said catalyst comprises lithium hydroxide or a basic lithium salt.

8. The process of claim 7 wherein said catalyst comprises lithium acetate.

9. The process of claim 6 wherein said catalyst comprises a neutral cobalt salt.

10. The process of claim 9 wherein said salt is cobalt acetate.

11. The process of claim 6 wherein said catalyst comprises lithium hydroxide or a basic lithium salt and a neutral cobalt salt.

12. The process of claim 11 wherein said catalyst comprises lithium hydroxide and cobalt acetate.

13. The process of claim 11 wherein said catalyst comprises lithium acetate and cobalt acetate.

14. The process of claim 6 wherein said catalyst comprises a basic potassium salt.

15. The process of claim 14 wherein said salt is potassium acetate.

* * * * *